UNITED STATES PATENT OFFICE.

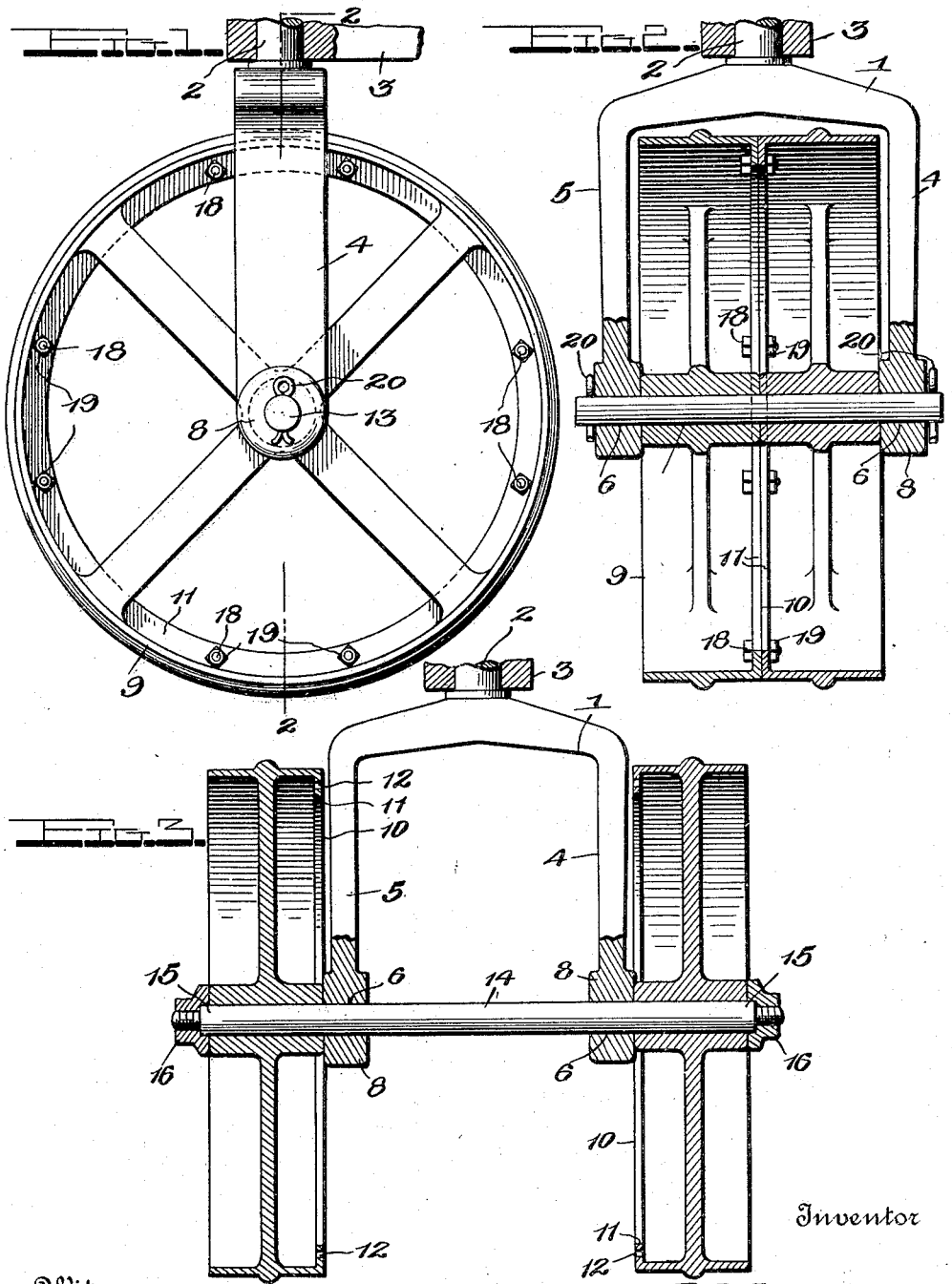

URVA D. MAXSON, OF PORTLAND, OREGON.

CONVERTIBLE FRONT TRACTOR GUIDE-WHEEL.

1,206,572.     Specification of Letters Patent.     Patented Nov. 28, 1916.

Application filed February 17, 1916. Serial No. 78,953.

*To all whom it may concern:*

Be it known that I, URVA D. MAXSON, a citizen of the United States, residing at Portland, in the county of Multnomah and State of Oregon, have invented certain new and useful Improvements in Convertible Front Tractor Guide-Wheels; and I do declare the following to be a full, clear, and exact description of the invention, such as will enable others skilled in the art to which it appertains to make and use the same.

This invention relates to new and useful improvements in wheels, and more particularly to front guide wheels which are used on tractors that employ the single wheel type to steer the same, and the primary object of this invention is to provide a wheel of this character which is rotatably mounted in a steering yoke, and which is so constructed that the wheel is formed in two sections which may be united and mounted on the axle between the arms of the yoke, or may be separated and mounted on the axle at opposite sides of the yoke so as to divide the wheel to enable the tractor to go astride a hummock, or the central part of the road that is not level.

Formerly, tractors that employed a single wheel steering type, were not practical for use in cultivating crops that are laid out in rows, for the reason that a proper hitch to the tractor could not be made without having its drivers go between the rows which would throw the front wheel directly on the row being cultivated. Also in driving the tractor over roads which have not been hard surfaced, a one wheel steered tractor would be useless on account of the center of said roads being frequently filled with rocks, stumps and other obstructions which would prevent the engine from going over the same with a single steering wheel in front. The use of my invention which employs my improved single steering wheel that may be divided, enables the tractor to be used in the above-named classes of work, as the two sections of the wheel may be placed on either side of the steering yoke so that they may straddle a row, or the center of a road, when so adjusted.

A further object of this invention is to provide a device of this character which is simple and durable in construction, inexpensive to manufacture, and one which will be very efficient in operation.

With these and numerous other objects in view, my invention consists of the novel features of construction, combination and arrangement of parts which will be herein referred to and more particularly pointed out in the specification and claims.

In the accompanying drawings:—Figure 1 is a side elevation of my improved tractor wheel mounted between the arms of the yoke; Fig. 2 is a central vertical section taken on the line 2—2 of Fig. 1; and Fig. 3 is a central vertical transverse section of the device, showing a portion of the yoke in elevation, with the sections of the wheel divided and positioned on either side of the yoke.

In the accompanying drawings the yoke 1 is of the ordinary type which is commonly used in steering devices of tractors, and is mounted on the lower end of a vertical pivot 2 which is mounted in a horizontally extending bearing 3, all of which conform to the conventional type of structure used in devices of this character. The yoke 1 is provided with arms 4 and 5 which have alining openings 6 adjacent their lower ends which are adapted to form bearings 8 for an axle 13 which supports the wheel.

My new improved tractor wheel which is designated by the numeral 9 is formed in two sections, each section being substantially one-half the width of the space between the arms of the yoke 4 and 5, and the inner edges of the rims 10 of the sections of this wheel are provided with inwardly projecting flanges 11 which are provided with apertures 12, for a purpose to be hereinafter more fully described.

The bearings 8 in the lower ends of the arms 4 and 5 of the yoke are adapted to receive either a short shaft 13, as illustrated in Fig. 2 of the drawings, or a long axle 14, as illustrated in Fig. 3 of the drawings, according to the position in which the wheels which are mounted on these axles are placed. When it is desired to position the wheels on either side of the outer faces of the arms 4 and 5 of the yoke, the long axle 14 is mounted through the bearings 8 and the projecting opposite ends 15 of the same are adapted to form spindles upon which the divided sections of the wheel 9 are mounted. These sections of the wheel are secured in position on the pintles by nuts 16 or any other desired fastening means that it may be desired to use.

If it is desired to unite the two sections of this wheel as illustrated in Fig. 2 of the drawings, a short shaft 13 is mounted in the bearings at the lower end of the arms 4 and 5 of the yoke, and the two sections of the wheel are mounted thereon between the said arms. When in this position, the inwardly projecting flanges 11 will have their outer faces lying flush with each other, and the apertures 12 in the same will be positioned in alinement. Fastening members, which are shown in the accompanying drawings as comprising bolts 18, are positioned through said alining apertures and are secured in said position by nuts 19 on the ends of the same. This means will securely hold the two sections of the wheel in engagement with each other and will unite the sections to form practically one wheel. The ends of the shaft 13 project a short distance from the outer surface of the arms 4 and 5 and are held in position by any desired means, for instance as shown at 20 in Figs. 1 and 2 of the drawings.

By the above described structure it will be obvious that this device forms a convertible wheel that can be used either as a single or two separate divided wheels, thereby making the tractor to which it is applied either a three or four wheel tractor, as the work may require. The single front steering wheel is very desirable on tractors on account of it being easy to guide, and on account of being mounted with full turn in a goose-neck frame which will allow the tractor to turn on less space than the average four wheel tractor. The greatest difficulty found in the actual work of these tractors is that an engine equipped with a single front steering wheel is only efficient for a certain class of work. A tractor that is provided with my new and improved form of single front steering wheel can, when it is desired, be used to cultivate crops that are laid out in rows, for it is capable of being so adjusted that the single front steering wheel will be separated and divided as illustrated in Fig. 3 of the drawings in such a manner that the two sections of the wheel may straddle the rows and therefore the tractor will be able to perform the desired work. There are also a number of other classes of work when it is impractical to use a three wheel tractor, such as for instance driving the same for hauling purposes over a road which has not been hard surfaced, owing to the fact that the center of the road would be too rough for the single centrally disposed steering wheel. By the use of my improved device, this steering wheel may be separated so as to straddle the rough parts of the road and hence the tractor may be used thereon as a four wheel tractor. When it is desired to use the three wheel tractor, the two sections of the wheel are secured together as shown in Figs. 1 and 2 of the drawings, and the single wheel of the ordinary type will be formed thereby. The application of a new and improved wheel of this character to an ordinary type of three wheel tractor would be a very simple matter, and it would immediately convert the same into either a single or double front wheel type and thereby make the tractor suitable for all kinds of work.

From the foregoing description of my new and improved construction of my new and improved tractor wheel, the manner of applying the same to use and the operation thereof will be readily understood, and it will be seen that I have provided an easy and simple yet efficient structure for carrying out the objects of this invention.

I claim:

1. The combination of an inverted substantially U-shaped yoke, said yoke having openings through its arms to form bearings, an axle extending through said bearings and removably mounted therein, a pair of ground wheels each of a width substantially one-half the width of the space between the arms of the yoke removably mounted on said axle between the arms, and releasable locking means between the abutting sides of the two wheels to detachably unite them when they are disposed end to end between the arms of said yoke.

2. The combination of an inverted substantially U-shaped steering yoke carried by a vertical pivot, said yoke having alining openings through its arms to form bearings, an axle extending through said bearings and removably mounted therein, a pair of ground wheels each of a width substantially one half of the width of the space between the arms of the yoke and removably mounted on said axle between the arms of said yoke, inwardly projecting annular flanges on the inner edges of the rims of said wheels adapted to engage each other when the wheels are mounted between the arms of said yoke, said flanges having alining apertures therethrough, and fastening members projecting through said apertures to detachably unite the wheels.

In testimony whereof I have hereunto set my hand in presence of two subscribing witnesses.

URVA D. MAXSON.

Witnesses:
L. M. LEPPER,
C. C. HALL.